(12) United States Patent
Koyamada et al.

(10) Patent No.: US 7,742,671 B2
(45) Date of Patent: Jun. 22, 2010

(54) OPTICAL FIBER

(75) Inventors: Yahei Koyamada, 12-13, Minamikoiwa 3-chome, Edogawa-ku, Tokyo (JP) 133-0056; Katsunori Imamura, Tokyo (JP)

(73) Assignees: The Furukawa Electric Co., Ltd., Tokyo (JP); Yahei Koyamada, Tokyo (JP)

( * ) Notice: Subject to any disclaimer, the term of this patent is extended or adjusted under 35 U.S.C. 154(b) by 0 days.

(21) Appl. No.: 12/196,429

(22) Filed: Aug. 22, 2008

(65) Prior Publication Data

US 2009/0148112 A1 Jun. 11, 2009

Related U.S. Application Data

(63) Continuation of application No. PCT/JP2007/063255, filed on Jul. 2, 2007.

(30) Foreign Application Priority Data

Jun. 30, 2006 (JP) .............................. 2006-182393

(51) Int. Cl.
G02B 6/02 (2006.01)
(52) U.S. Cl. ...................... 385/126; 385/123; 385/124; 385/127; 385/128
(58) Field of Classification Search ................. 385/126
See application file for complete search history.

(56) References Cited

U.S. PATENT DOCUMENTS 7,440,665 B2 * 10/2008 Hasegawa ................... 385/127

2004/0228593 A1 * 11/2004 Sun et al. .................... 385/127
2007/0189699 A1 8/2007 Matsuo et al.

FOREIGN PATENT DOCUMENTS

| JP | 2584151 B2 | 11/1996 |
| JP | 2753426 B2 | 2/1998 |
| JP | 3580640 B2 | 7/2004 |
| JP | 2006-133314 A1 | 5/2006 |
| WO | WO 2006/043698 | 4/2006 |

OTHER PUBLICATIONS

Katsunori Imamura et al., "SBS Shikiichi O 6dB Kaizen shita Hikari Fiber", IEICE Technical Report, OFT2006-32 to 39, vol. 106, No. 286, Oct. 13, 2006, pp. 5 to 8, Figs. 1, 2-a, table 1.
U.S. Appl. No. 12/197,596, filed Aug. 25, 2008, Tadakuma.
U.S. Appl. No. 12/546,894, filed Aug. 25, 2009, Imamura.

* cited by examiner

Primary Examiner—Ryan Lepisto
(74) Attorney, Agent, or Firm—Oblon, Spivak, McClelland, Maier & Neustadt, L.L.P.

(57) ABSTRACT

A silica-based optical fiber includes a core and a cladding that is formed on an outer circumference of the core. The core includes three or more layers including a layer doped with at least one of germanium and fluorine, and a concentration of the germanium or the fluorine in each of the layers is controlled in such a manner that a Brillouin gain spectral peak is spread into a plurality of peaks on a Brillouin gain spectrum. With this scheme, an optical fiber is provided, which has stable characteristics in the longitudinal direction, and which has a high SBS threshold so that generation of the SBS can be effectively suppressed.

2 Claims, 19 Drawing Sheets

FIG.4

| | $\Delta 1\text{-GeO}_2$ | $\Delta 1\text{-F}$ | a/c | $\Delta 2\text{-GeO}_2$ | $\Delta 2\text{-F}$ | b/c | $\Delta 3\text{-GeO}_2$ | $\Delta 3\text{-F}$ | CORE DIAMETER (2c) |
|---|---|---|---|---|---|---|---|---|---|
| | % | % | | % | % | | % | % | μm |
| EMBODIMENT EXAMPLE 1 | 0.7 | -0.4 | 0.27 | 0.4 | -0.1 | 0.57 | 0.3 | 0 | 9.4 |
| EMBODIMENT EXAMPLE 2 | 0.7 | -0.38 | 0.25 | 0.42 | -0.1 | 0.48 | 0.32 | 0 | 9.4 |

FIG.6

| CORE DIAMETER | CLADDING DIAMETER | BRANCH LENGTH | TRANS- MISSION LOSS | WAVELENGTH DISPERSION | WAVELENGTH DISPERSION SLOPE | PMD | MFD | Aeff | CUTOFF WAVELENGTH | | BENDING LOSS (20φ) |
|---|---|---|---|---|---|---|---|---|---|---|---|
| | | | | | | | | | 2 m | 22 m | |
| μm | μm | km | dB/km | ps/nm/km | ps/nm²/km | ps/√km | μm | μm² | nm | nm | dB/m |
| 9.4 | 125.0 | 11.9 | 0.226 | 17.9 | 0.060 | 0.052 | 10.91 | 93.9 | 1297 | 1244 | 10.1 |

| PEAK FREQUENCY [GHz] (SPECTRAL WIDTH [MHz]) | | | |
|---|---|---|---|
| △10.22 (37.10) | 10.54 | ◎10.82 (38.35) | ○10.96 (37.44) |

◎: FIRST PEAK, ○: SECOND PEAK, △: THIRD PEAK

FIG.10

| | Δ1-GeO₂ % | Δ1-F % | a/c | Δ2-GeO₂ % | Δ2-F % | b/c | Δ3-GeO₂ % | 2c μm | (Δ1-GeO₂)-(Δ2-GeO₂) % | (Δ1-F)-(Δ2-F) % | b/c-a/c | JUDGE |
|---|---|---|---|---|---|---|---|---|---|---|---|---|
| CALCULATION EXAMPLE 1 | 0.35 | 0 | 0.3 | 0.55 | -0.2 | 0.5 | 0.35 | 9.0 | -0.2 | 0.2 | | |
| CALCULATION EXAMPLE 2 | 0.45 | -0.1 | 0.3 | 0.55 | -0.2 | 0.5 | 0.35 | 9.0 | -0.1 | 0.1 | 0.2 | |
| CALCULATION EXAMPLE 3 | 0.55 | -0.2 | 0.3 | 0.55 | -0.2 | 0.5 | 0.35 | 9.0 | 0.0 | 0.0 | 0.2 | |
| CALCULATION EXAMPLE 4 | 0.65 | -0.3 | 0.3 | 0.55 | -0.2 | 0.5 | 0.35 | 9.0 | 0.1 | -0.1 | 0.2 | ○ |
| CALCULATION EXAMPLE 5 | 0.75 | -0.4 | 0.3 | 0.55 | -0.2 | 0.5 | 0.35 | 9.0 | 0.2 | -0.2 | 0.2 | ○ |
| CALCULATION EXAMPLE 6 | 0.85 | -0.5 | 0.3 | 0.55 | -0.2 | 0.5 | 0.35 | 9.0 | 0.3 | -0.3 | 0.2 | ○ |
| CALCULATION EXAMPLE 7 | 0.95 | -0.6 | 0.3 | 0.55 | -0.2 | 0.5 | 0.35 | 9.0 | 0.4 | -0.4 | 0.2 | ○ |
| CALCULATION EXAMPLE 8 | 1.05 | -0.7 | 0.3 | 0.55 | -0.2 | 0.5 | 0.35 | 9.0 | 0.5 | -0.5 | 0.2 | ○ |

FIG.12

| | Δ1-GeO$_2$ | Δ1-F | a/c | Δ2-GeO$_2$ | Δ2-F | b/c | Δ3-GeO$_2$ | 2c | (Δ1-GeO$_2$)-(Δ2-GeO$_2$) | (Δ1-F)-(Δ2-F) | b/c-a/c | JUDGE |
|---|---|---|---|---|---|---|---|---|---|---|---|---|
| | % | % | | % | % | | % | μm | % | % | | |
| CALCULATION EXAMPLE 9 | 0.75 | -0.4 | 0.3 | 0.35 | 0 | 0.5 | 0.35 | 9.0 | 0.4 | -0.4 | 0.2 | |
| CALCULATION EXAMPLE 10 | 0.75 | -0.4 | 0.3 | 0.45 | -0.1 | 0.5 | 0.35 | 9.0 | 0.3 | -0.3 | 0.2 | |
| CALCULATION EXAMPLE 11 | 0.75 | -0.4 | 0.3 | 0.55 | -0.2 | 0.5 | 0.35 | 9.0 | 0.2 | -0.2 | 0.2 | ○ |
| CALCULATION EXAMPLE 12 | 0.75 | -0.4 | 0.3 | 0.65 | -0.3 | 0.5 | 0.35 | 9.0 | 0.1 | -0.1 | 0.2 | ○ |
| CALCULATION EXAMPLE 13 | 0.75 | -0.4 | 0.3 | 0.75 | -0.4 | 0.5 | 0.35 | 9.0 | 0.0 | 0.0 | 0.2 | |
| CALCULATION EXAMPLE 14 | 0.75 | -0.4 | 0.3 | 0.85 | -0.5 | 0.5 | 0.35 | 9.0 | -0.1 | 0.1 | 0.2 | |

FIG.14

| | Δ1-GeO₂ | Δ1-F | a/c | Δ2-GeO₂ | Δ2-F | b/c | Δ3-GeO₂ | 2c | (Δ1-GeO₂)-(Δ2-GeO₂) | (Δ1-F)-(Δ2-F) | b/c-a/c | JUDGE |
|---|---|---|---|---|---|---|---|---|---|---|---|---|
| | % | % | | % | % | | % | μm | % | % | | |
| CALCULATION EXAMPLE 15 | 0.75 | -0.4 | 0.0 | 0.55 | -0.2 | 0.5 | 0.35 | 9.0 | 0.2 | -0.2 | 0.5 | |
| CALCULATION EXAMPLE 16 | 0.75 | -0.4 | 0.1 | 0.55 | -0.2 | 0.5 | 0.35 | 9.0 | 0.2 | -0.2 | 0.4 | |
| CALCULATION EXAMPLE 17 | 0.75 | -0.4 | 0.2 | 0.55 | -0.2 | 0.5 | 0.35 | 9.0 | 0.2 | -0.2 | 0.3 | ○ |
| CALCULATION EXAMPLE 18 | 0.75 | -0.4 | 0.3 | 0.55 | -0.2 | 0.5 | 0.35 | 9.0 | 0.2 | -0.2 | 0.2 | ○ |
| CALCULATION EXAMPLE 19 | 0.75 | -0.4 | 0.4 | 0.55 | -0.2 | 0.5 | 0.35 | 9.0 | 0.2 | -0.2 | 0.1 | ○ |
| CALCULATION EXAMPLE 20 | 0.75 | -0.4 | 0.5 | 0.55 | -0.2 | 0.5 | 0.35 | 9.0 | 0.2 | -0.2 | 0.0 | ○ |

FIG.16

| | Δ1-GeO$_2$ | Δ1-F | a/c | Δ2-GeO$_2$ | Δ2-F | b/c | Δ3-GeO$_2$ | 2c | (Δ1-GeO$_2$)-(Δ2-GeO$_2$) | (Δ1-F)-(Δ2-F) | b/c-a/c | JUDGE |
|---|---|---|---|---|---|---|---|---|---|---|---|---|
| | % | % | | % | % | | % | μm | % | % | | |
| CALCULATION EXAMPLE 21 | 0.75 | -0.4 | 0.3 | 0.55 | -0.2 | 0.3 | 0.35 | 9.0 | 0.2 | -0.2 | 0.0 | |
| CALCULATION EXAMPLE 22 | 0.75 | -0.4 | 0.3 | 0.55 | -0.2 | 0.4 | 0.35 | 9.0 | 0.2 | -0.2 | 0.1 | |
| CALCULATION EXAMPLE 23 | 0.75 | -0.4 | 0.3 | 0.55 | -0.2 | 0.5 | 0.35 | 9.0 | 0.2 | -0.2 | 0.2 | ○ |
| CALCULATION EXAMPLE 24 | 0.75 | -0.4 | 0.3 | 0.55 | -0.2 | 0.6 | 0.35 | 9.0 | 0.2 | -0.2 | 0.3 | ○ |
| CALCULATION EXAMPLE 25 | 0.75 | -0.4 | 0.3 | 0.55 | -0.2 | 0.7 | 0.35 | 9.0 | 0.2 | -0.2 | 0.4 | ○ |
| CALCULATION EXAMPLE 26 | 0.75 | -0.4 | 0.3 | 0.55 | -0.2 | 0.8 | 0.35 | 9.0 | 0.2 | -0.2 | 0.5 | |
| CALCULATION EXAMPLE 27 | 0.75 | -0.4 | 0.3 | 0.55 | -0.2 | 0.9 | 0.35 | 9.0 | 0.2 | -0.2 | 0.6 | |

FIG.18

| | Δ1-GeO$_2$ | Δ1-F | a/c | Δ2-GeO$_2$ | Δ2-F | b/c | Δ3-GeO$_2$ | 2c | (Δ1-GeO$_2$)-(Δ2-GeO$_2$) | (Δ1-F)-(Δ2-F) | b/c-a/c | JUDGE |
|---|---|---|---|---|---|---|---|---|---|---|---|---|
| | % | % | | % | % | | % | μm | % | % | | |
| CALCULATION EXAMPLE 28 | 1.1 | -0.7 | 0.3 | 0.55 | -0.2 | 0.5 | 0.35 | 9.0 | 0.55 | -0.5 | 0.2 | ○ |
| CALCULATION EXAMPLE 29 | 0.75 | -0.4 | 0.27 | 0.5 | -0.1 | 0.5 | 0.35 | 9.0 | 0.25 | -0.3 | 0.23 | ○ |
| CALCULATION EXAMPLE 30 | 0.85 | -0.5 | 0.3 | 0.7 | -0.4 | 0.5 | 0.35 | 9.0 | 0.15 | -0.1 | 0.2 | ○ |

FIG.20

| | Δ1-GeO$_2$ | Δ1-F | a/c | Δ2-GeO$_2$ | Δ2-F | b/c | Δ3-GeO$_2$ | Δ3-F | 2c | (Δ2-GeO$_2$)-(Δ3-GeO$_2$) | (Δ2-F)-(Δ3-F) | JUDGE |
|---|---|---|---|---|---|---|---|---|---|---|---|---|
| | % | % | | % | % | | % | % | μm | % | % | |
| CALCULATION EXAMPLE 31 | 0.85 | -0.5 | 0.3 | 0.65 | -0.3 | 0.5 | 0.35 | 0 | 9.0 | 0.3 | -0.3 | ○ |
| CALCULATION EXAMPLE 32 | 0.85 | -0.5 | 0.3 | 0.65 | -0.3 | 0.5 | 0.45 | -0.1 | 9.0 | 0.2 | -0.2 | ○ |
| CALCULATION EXAMPLE 33 | 0.85 | -0.5 | 0.3 | 0.65 | -0.3 | 0.5 | 0.5 | 0.15 | 9.0 | 0.15 | -0.15 | ○ |
| CALCULATION EXAMPLE 34 | 0.85 | -0.5 | 0.3 | 0.65 | -0.3 | 0.5 | 0.55 | -0.2 | 9.0 | 0.1 | -0.1 | |
| CALCULATION EXAMPLE 35 | 0.85 | -0.5 | 0.3 | 0.65 | -0.3 | 0.5 | 0.65 | -0.3 | 9.0 | 0 | 0 | |
| CALCULATION EXAMPLE 36 | 0.85 | -0.5 | 0.3 | 0.65 | -0.3 | 0.5 | 0.75 | -0.4 | 9.0 | -0.1 | 0.1 | |

OPTICAL FIBER

CROSS-REFERENCE TO RELATED APPLICATIONS

This application is a continuation of PCT international application Ser. No. PCT/JP2007/063255 filed Jul. 2, 2007 which designates the United States, incorporated herein by reference, and which claims the benefit of priority from Japanese Patent Application No. 2006-182393, filed Jun. 30, 2006, incorporated herein by reference.

BACKGROUND OF THE INVENTION

1. Field of the Invention

The present invention relates to an optical fiber that can suppress generation of stimulated Brillouin scattering.

2. Description of the Related Art

To realize a large-capacity optical communication, a wavelength-division-multiplexing (WDM) system or a time-division-multiplexing (TDM) system has been adopted. In this kind of communication system, when the optical intensity input to an optical fiber, which is a transmission line, increases, generation of a nonlinear optical phenomenon in the optical fiber becomes prominent. The stimulated Brillouin scattering (SBS), which is one of the nonlinear optical phenomena, is a phenomenon in which a part of a light input to an optical fiber is back scattered, and the scattered light, i.e., Brillouin scattered light causes a stimulated scattering, which is generated by an interaction between a light propagating through the optical fiber and an acoustic wave. When the SBS is generated, it becomes an obstacle to a light propagation in the optical fiber. Since the SBS is generated when the intensity of an input light becomes equal to or larger than a threshold (SBS threshold), it is preferable that the optical fiber used in the transmission line should have a high SBS threshold. A gain experienced when the Brillouin scattered light causes the stimulated scattering is referred to as a Brillouin gain.

So far, as a method of increasing the SBS threshold, methods of changing characteristics of the optical fiber, such as a wavelength dispersion and a transmission loss, in the longitudinal direction by changing a core diameter or a doping amount of a dopant to be doped into the core in the longitudinal direction of the fiber have been proposed (see, for example, Japanese Patent No. 2584151, Japanese Patent No. 2753426, and Japanese Patent No. 3580640). According to these methods, because a shift amount of the Brillouin scattered light with respect to the input light on a frequency spectrum of the light (Brillouin shift amount) is changed in the longitudinal direction of the optical fiber, the SBS can be hardly generated, increasing the SBS threshold. Meanwhile, an optical fiber has been disclosed (see, for example, Japanese Patent Application Laid-Open No. 2006-133314), which can increase the SBS threshold without changing the characteristics of the optical fiber in the longitudinal direction by doping germanium and fluorine into the optical fiber with a portion of the highest fluorine concentration arranged on outside of a portion of the highest germanium concentration.

However, with the optical fibers described in Japanese Patent No. 2584151, Japanese Patent No. 2753426, and Japanese Patent No. 3580640, in which the characteristics are changed in the longitudinal direction, even though the generation of the SBS can be suppressed owing to an increase of the SBS threshold, there is a problem that the characteristics cannot be maintained stable in the longitudinal direction of the optical fiber. As a result, when an optical signal propagates through the optical fiber, there is a possibility of degradation of the optical signal, such as distortion of a signal waveform, when the optical signal passes through a portion of the fiber where the characteristics are locally changed. Although the optical fiber described in Japanese Patent Application Laid-Open No. 2006-133314 does not have a change of the characteristics in the longitudinal direction, the effect of increasing the SBS threshold is not enough.

SUMMARY OF THE INVENTION

It is an object of the present invention to at least partially solve the problems in the conventional technology.

According to an aspect of the present invention, there is provided a silica-based optical fiber including a core and a cladding that is formed on an outer circumference of the core. The core includes three or more layers including a layer doped with at least one of germanium and fluorine. A concentration of the germanium or the fluorine in each of the layers is controlled in such that a Brillouin gain spectral peak is spread into a plurality of peaks on a Brillouin gain spectrum.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram for showing specific design parameters for the refractive index profile of the optical fiber according to the embodiment of the present invention;

FIG. 6 is a diagram for showing general characteristics of the optical fiber according to the first embodiment example of the present invention;

FIG. 10 is a diagram for showing combinations of the design parameters for a first to an eighth calculation examples;

FIG. 12 is a diagram for showing combinations of the design parameters for a ninth to a fourteenth calculation examples;

FIG. 14 is a diagram for showing combinations of the design parameters for a fifteenth to a twentieth calculation examples;

FIG. 16 is a diagram for showing combinations of the design parameters for a twenty-first to a twenty-seventh calculation examples;

FIG. 18 is a diagram for showing combinations of the design parameters for a twenty-eighth to a thirtieth calculation examples;

FIG. 20 is a diagram for showing combinations of the design parameters for a thirty-first to a thirty-sixth calculation examples.

DETAILED DESCRIPTION OF THE PREFERRED EMBODIMENTS

Exemplary embodiments of an optical fiber according to the present invention will be explained in detail below with reference to the accompanying drawings. However, the present invention is not to be considered limited to the embodiments.

Figure 1:
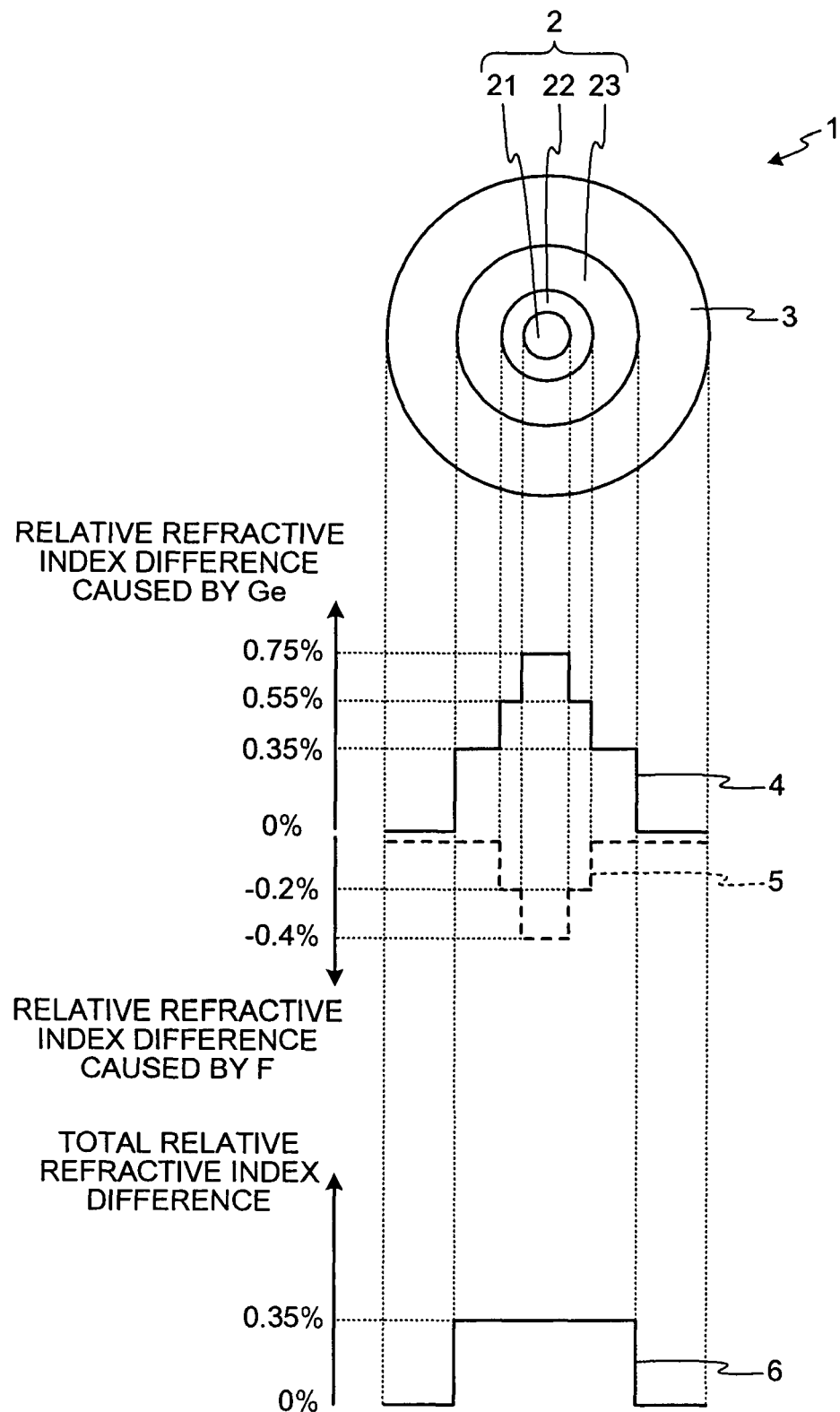
FIG. 1 is a schematic diagram for illustrating a cross section and a refractive index profile of an optical fiber according to an embodiment of the present invention.

FIG. 1 is a schematic diagram for illustrating a cross section and a refractive index profile of an optical fiber 1 according to an embodiment of the present invention. As shown in FIG. 1, the optical fiber 1 according to the present embodiment is a single-mode optical fiber including a core 2 and a cladding 3 that is formed on the outer circumference of the core 2.

The core 2 includes a center core layer 21, an inner core layer 22, and an outer core layer 23, having three concentric outer circumferences including a layer that is doped with at least one of germanium (Ge) and fluorine (F). The Ge is doped as a form of $GeO_2$. The cladding 3 is formed with a pure silica glass that does not contain any dopant for changing the refractive index.

As described in Y. Koyamada, et al., J. Lightwave Technol., 22, 631 (2004), relations between concentrations of the germanium and the fluorine, the refractive index, and the relative refractive index difference with respect to the pure silica glass in the silica glass doped with the germanium and the fluorine are represented by following Equations (1) to (4).

$$n=1.458(1+1.0\times10^{-3}W_{GeO2}-3.3\times10^{-3}W_F) \quad (1)$$

$$\Delta=(n-n_{SiO2})/n_{SiO2}=1.458(1.0\times10^{-3}W_{GeO2}-3.3\times10^{-3}W_F)/n_{SiO2} \quad (2)$$

$$\Delta_{GeO2}=1.458W_{GeO2}\times10^{-3}/n_{SiO2} \quad (3)$$

$$\Delta_F=(-3.3\times1.458)W_F\times10^{-3}/n_{SiO2} \quad (4)$$

where n is the refractive index, $W_{GeO2}$ is the doping concentration of the $GeO_2$ (weight %), $W_F$ is the doping concentration of the fluorine (weight %), $\Delta$ is the relative refractive index difference, $n_{SiO2}$ is the refractive index of the pure silica glass, $\Delta_{GeO2}$ is the relative refractive index difference caused by the Ge, and $\Delta_F$ is the relative refractive index difference caused by the F.

In FIG. 1, a refractive index profile 4 indicates the relative refractive index difference of each of the core layers caused by the Ge. Although the Ge increases the relative refractive index difference, because the Ge concentration is different in each of the core layers, the relative refractive index difference also differs layer by layer. The relative refractive index difference caused by the Ge is 0.75% in the center core layer 21, 0.55% in the inner core layer 22, and 0.35% in the outer core layer 23. A refractive index profile 5 indicates the relative refractive index difference of each of the core layers caused by the F. Although the F decreases the relative refractive index difference, because the F concentration is different in each of the core layers, the relative refractive index difference also differs layer by layer. The relative refractive index difference caused by the F is −0.4% in the center core layer 21, −0.2% in the inner core layer 22, and 0% in the outer core layer 23. A refractive index profile 6 indicates a total relative refractive index difference obtained by adding up the refractive index profiles caused by the Ge and the F. In the optical fiber 1, the germanium and the fluorine are doped in a concentration ratio with which the relative refractive index difference becomes the same between the center core layer 21, the inner core layer 22, and the outer core layer 23. As a result, the total relative refractive index difference becomes the same 0.35% in the center core layer 21, the inner core layer 22, and the outer core layer 23, resulting in an optical fiber having a so-called step-index type refractive index profile. The above relative refractive index difference index is on the basis of the refractive index of the cladding 3.

Although the total relative refractive index difference of the center core layer 21, the inner core layer 22, and the outer core layer 23 is not necessarily to be the same, for example, it is preferable that the total relative refractive index difference should be 0.3% to 0.4% in all of the layers, and a core diameter (a core diameter of the outer core layer 23) should be 7.5 µm to 10.0 µm, to obtain characteristics equivalent to those of a single-mode optical fiber (SMF) used as a typical transmission line in an optical-fiber communication system. In addition, it is also possible to take an arbitrary refractive index profile according to demanded characteristics of the optical fiber.

As a result, in the optical fiber 1, by setting the concentrations of the germanium and the fluorine as described above in the center core layer 21, the inner core layer 22, and the outer core layer 23, a Brillouin gain spectral peak is spread into a plurality of peaks on a Brillouin gain spectrum. This is because both of the germanium and the fluorine have an effect of decreasing a velocity of an acoustic wave, while the velocity of the acoustic wave depends on a material of a waveguide, so that a field distribution of the acoustic wave can be controlled while realizing a desired refractive index profile. Since the Brillouin scattering is generated by an interaction of the light and the acoustic wave, by adjusting the superposition of the field distribution of the light and a field distribution of the acoustic wave, a frequency of the Brillouin scattering can be changed, so that the Brillouin gain spectral peak is spread into a plurality of peaks on the Brillouin gain spectrum, making it possible to suppress the generation of the SBS. In addition, with the configuration of the present invention, the intensity of each of the peaks can be made virtually constant by appropriately adjusting the concentration ratio of the germanium and the fluorine, so that the generation of the SBS can be effectively suppressed.

Figure 2:
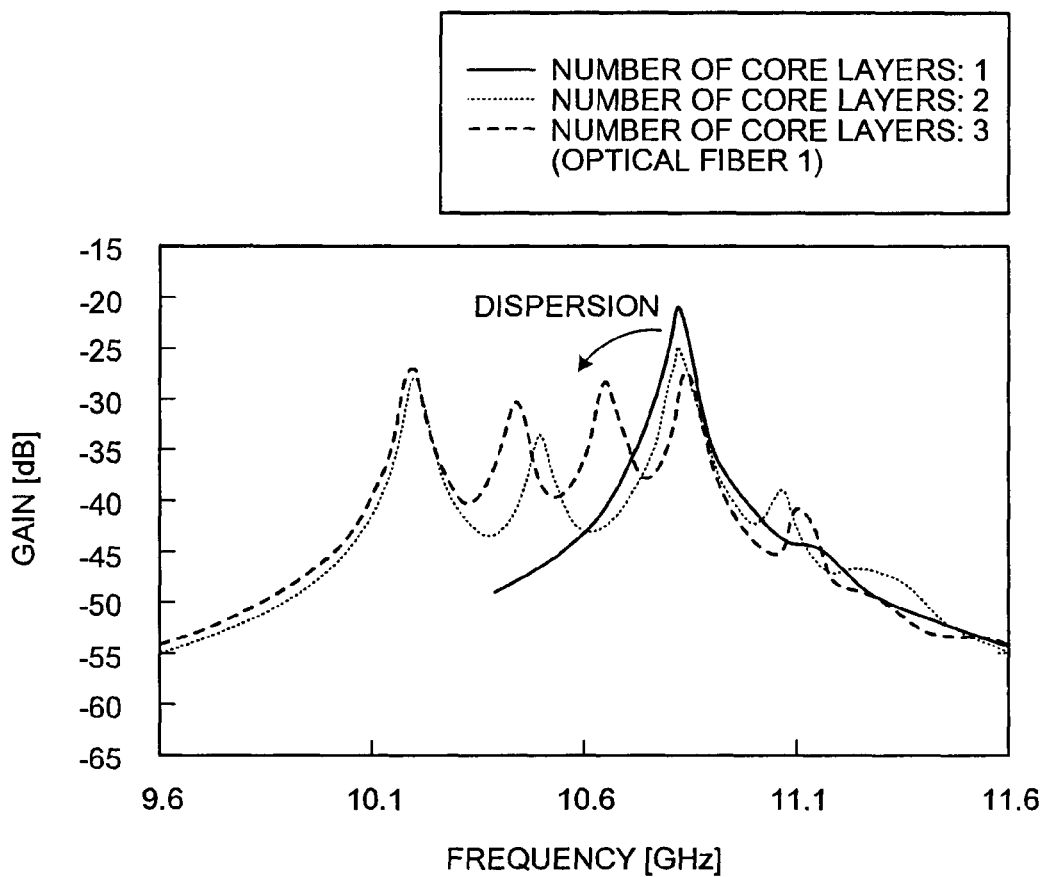
FIG. 2 is a graph showing a Brillouin gain spectrum calculated by a simulation for optical fibers with the number of core layers one to three.

FIG. 2 is a graph showing a Brillouin gain spectrum calculated by a simulation for optical fibers with the number of core layers one to three. The optical fiber having three core layers is an optical fiber such as the one shown in FIG. 1. The optical fiber having two core layers is an optical fiber having a refractive index profile in which the refractive index profile of the inner core layer 22 is set to same refractive index profile as the outer core layer 23 in the optical fiber shown in FIG. 1. The optical fiber having one core layer is an optical fiber having a refractive index profile in which the refractive index profiles of the center core layer 21 and the inner core layer 22 are set to same refractive index profile as the outer core layer 23 in the optical fiber shown in FIG. 1. In FIG. 2, the horizontal axis is the Brillouin frequency. As shown in FIG. 2, the superposition of the light propagating through the optical fiber and the acoustic wave is changed with increase of the number of core layers, and the Brillouin gain spectral peak is spread into a plurality of peaks on the Brillouin gain spectrum. When the number of core layers is three, such as in the case of the optical fiber 1 according to the present embodiment, the peak is spread into four by an adjustment of the superposition of the light and the acoustic wave. As a result, because the value of the peak is further decreased, compared with the case where the number of core layers is two to three, the SBS threshold is increased, making it possible to effectively suppress the generation of the SBS without changing the characteristics in the longitudinal direction.

Figure 3:
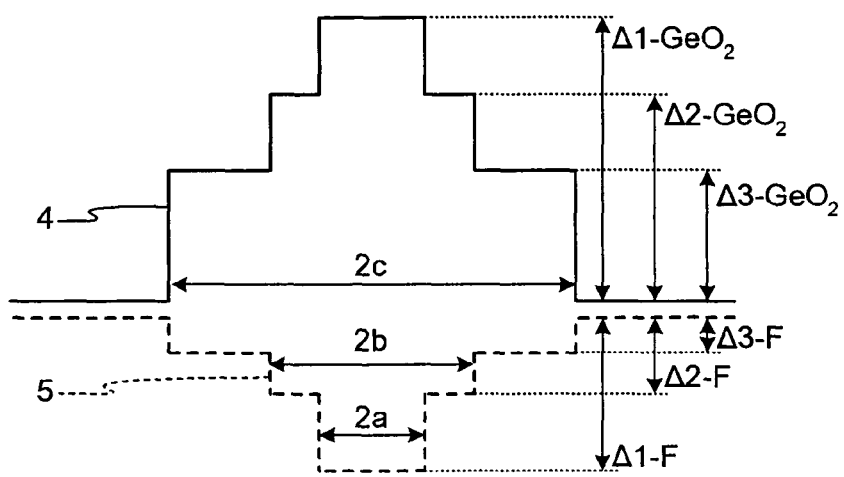
FIG. 3 is a schematic diagram for explaining design parameters for defining the refractive index profile of a core of the optical fiber according to the embodiment of the present invention.

An optical fiber fabricated by way of trial as an embodiment example of the present invention will be explained below. FIG. 3 is a schematic diagram for explaining design parameters for defining the refractive index profile of a core of the optical fiber according to the embodiment of the present invention. The core diameters of the center core layer 21, the inner core layer 22, and the outer core layer 23 are $2a$, $2b$, and $2c$, respectively. The relative refractive index differences of the center core layer 21, the inner core layer 22, the outer core layer 23 indicated by the refractive index profile 4 caused by the Ge are $\Delta 1\text{-GeO}_2$, $\Delta 2\text{-GeO}_2$, and $\Delta 3\text{-GeO}_2$, respectively. The relative refractive index differences of the center core layer 21, the inner core layer 22, and the outer core layer 23 indicated by the refractive index profile 5 caused by the F are $\Delta 1\text{-F}$, $\Delta 2\text{-F}$, and $\Delta 3\text{-F}$, respectively. The core diameter $2a$ of the center core layer 21 is defined by a diameter at a position where the relative refractive index difference is a half of $(\Delta 1\text{-GeO}_2)-(\Delta 2\text{-GeO}_2)$ in a boundary area between the center core layer 21 and the inner core layer 22. Similarly, the core diameter $2b$ of the inner core layer 22 is defined by a diameter at a position where the relative refractive index difference is a half of $(\Delta 2\text{-GeO}_2)-(\Delta 3\text{-GeO}_2)$ in a boundary area between the inner core layer 22 and the outer core layer 23. Similarly, the core diameter $2c$ of the outer core layer 23 is defined by a diameter at a position where the relative refractive index difference is a half of $\Delta 3\text{-GeO}_2$ in a boundary area between the outer core layer 23 and the cladding 3. FIG. 4 is a diagram for showing specific design parameters for the refractive index profile of the optical fiber according to the embodiment of the present invention. In both cases of a first embodiment example and a second embodiment example, the relative refractive index differences of the center core layer 21, the inner core layer 22, and the outer core layer 23 are set to be the same value, with a value of 0.3% in the first embodiment example, and 0.32% in the second embodiment example.

Figure 5:
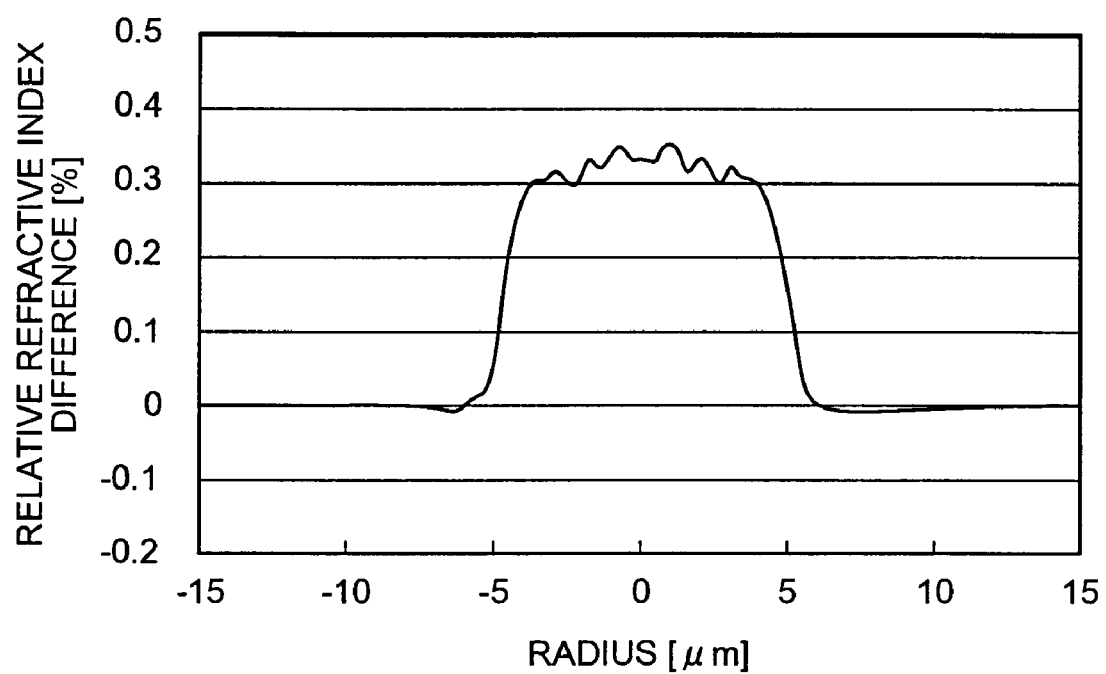
FIG. 5 is a graph showing a result of measuring a refractive index profile of an optical fiber according to a first embodiment example of the present invention.

FIG. 5 is a graph showing a result of measuring a refractive index profile of an optical fiber according to the first embodiment example by the RNF method (reflection near-field method). As shown in FIG. 5, the relative refractive index difference of the core is virtually constant to be about 0.3%, on which the design parameters shown in FIG. 4 are reflected.

FIG. 6 is a diagram for showing general characteristics of the optical fiber according to the first embodiment example. In the figure, PMD indicates the polarization mode dispersion, MFD indicates the mode field diameter, and $A_{eff}$ indicates the effective core area. The transmission loss, the wavelength dispersion, the wavelength dispersion slope, the PMD, the MFD, the $A_{eff}$ and the bending loss are values at the wavelength of 1550 nm. The characteristics of the single-mode fiber (SMF) used as a typical transmission line in an optical-fiber communication system show that the wavelength dispersion is 16 ps/nm/km to 20 ps/nm/km, the MFD is 10.0 μm to 11.0 μm, and the cutoff wavelength $\lambda_c$ is equal to or less than 1310 nm, and as shown in FIG. 6, the optical fiber according to the first embodiment example has the characteristics equivalent to those of the SMF in the wavelength dispersion, the MFD, and the cutoff wavelength. Furthermore, an optical fiber according to the second embodiment example also has virtually the same characteristics as the first embodiment example. In the optical fiber according to the first embodiment example, as shown in FIG. 6, the core diameter $2c$ of the outer core layer in the above-described definition is 9.4 μm. On the other hand, if the core diameter is defined as the outer diameter of the outer core layer in a skirt of the refractive index profile, the core diameter is 10.1 μm.

The cutoff wavelength referred in this specification means the fiber cutoff wavelength $\lambda_c$ and the cable cutoff wavelength $\lambda_{cc}$ defined in ITU-T (International Telecommunication Union) G. 650. In FIG. 6, the 2 m cutoff wavelength is the fiber cutoff wavelength $\lambda_c$, and the 22 m cutoff wavelength is the cable cutoff wavelength $\lambda_{cc}$. Other terminologies not specifically defined in this specification comply with the definitions and the measurement methods in the ITU-T G. 650.

Figure 7:
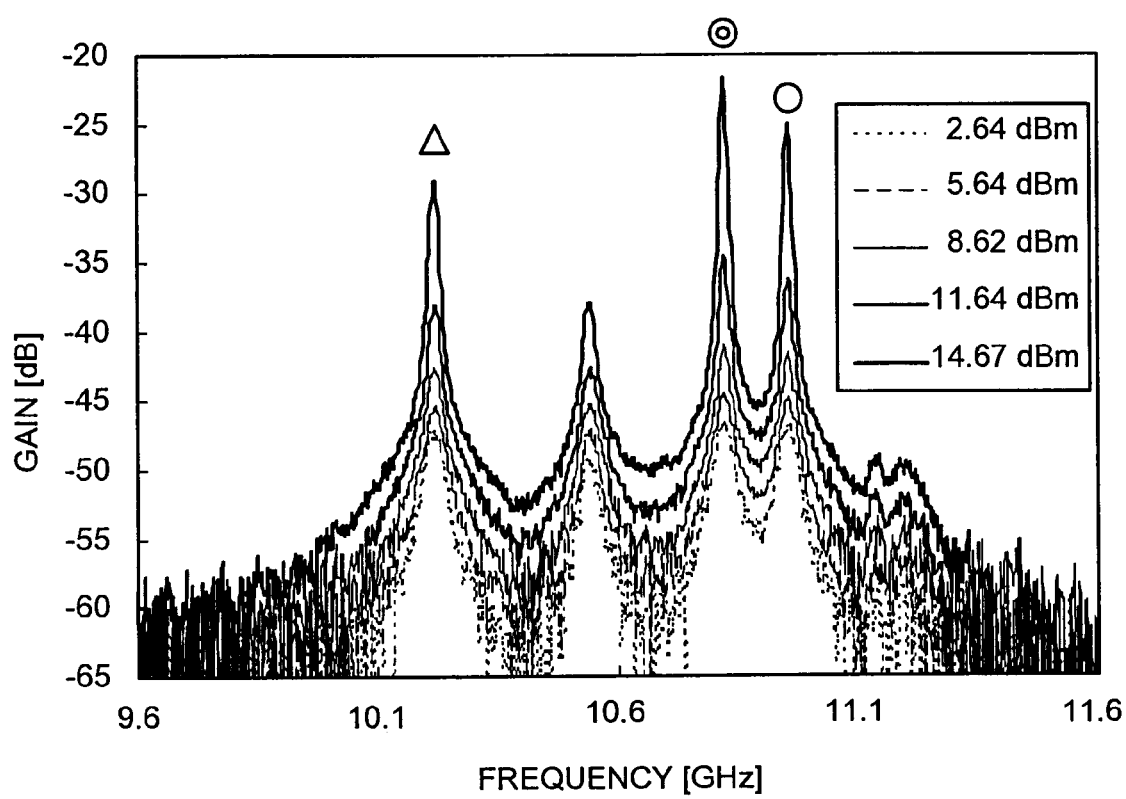
FIG. 7 is a graph showing the Brillouin gain spectrum when a light of a wavelength of 1550 nm is input to the optical fiber according to the first embodiment example of the present invention by changing a light intensity from 2.64 dBm to 14.67 dBm.
Figures 8, 9:
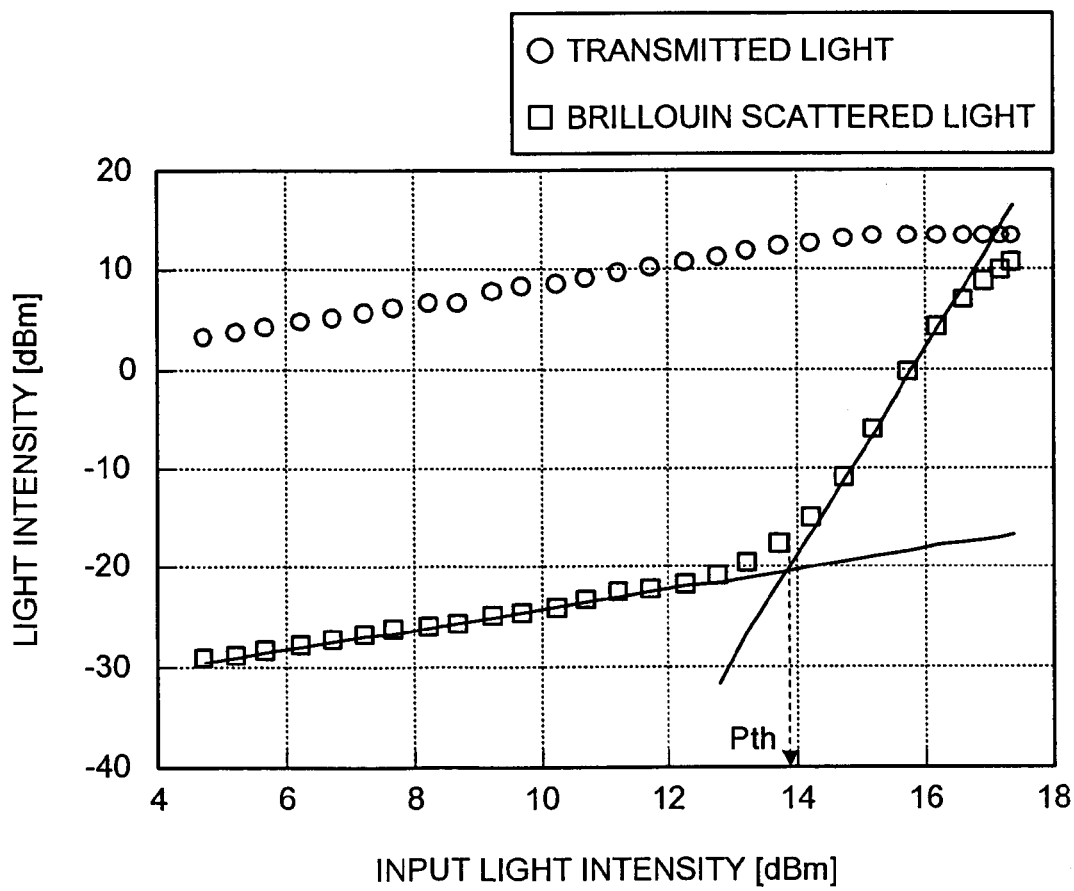
FIG. 8 is a diagram for showing a peak frequency and a spectral width of the Brillouin gain spectrum shown in FIG. 7.
FIG. 9 is a graph for explaining a method of calculating an SBS threshold $P_{th}$ of the optical fiber according to the first embodiment example of the present invention.

FIG. 7 is a graph showing the Brillouin gain spectrum when a light of the wavelength of 1550 nm is input to the optical fiber according to the first embodiment example by changing the light intensity from 2.64 dBm to 14.67 dBm. FIG. 8 is a diagram for showing a peak frequency and a spectral width of the Brillouin gain spectrum shown in FIG. 7. As shown in FIG. 7, there are four peaks on the Brillouin gain spectrum. The intensity of each peak increases with an increase of the optical intensity of an input light. When the input optical intensity is 14.67 dBm, the intensity of a first peak having the highest intensity rapidly increases, and the SBS is generated. As shown in FIG. 8, the frequency of the first peak with a symbol "☉" is 10.82 GHz with a spectral width of 38.35 MHz. The frequency of a second peak with a symbol "○" is 10.96 GHz with a spectral width of 37.44 MHz. The frequency of a third peak with a symbol "Δ" is 10.22 GHz with a spectral width of 37.10 MHz. The frequency of a fourth peak with no symbol is 10.54 GHz. That is, in the optical fiber according to the first embodiment example, the Brillouin gain spectral peak is spread into four peaks on the Brillouin gain spectrum by setting the concentrations of the germanium and the fluorine in each core layer in such a manner that the above-described relative refractive index difference is realized.

FIG. 9 is a graph for explaining a method of calculating the SBS threshold $P_{th}$ of the optical fiber according to the first embodiment example. In FIG. 9, a relationship between the optical intensity of an input light that is input to the optical fiber, the optical intensity of a transmitted light that transmitted through the optical fiber from among the input light, and the intensity of Brillouin scattered light that is scattered toward the input side. In an area where the optical intensity of the input light is low, the intensities of the transmitted light and the Brillouin scattered light increase in proportion to the optical intensity of the input light. However, if the optical intensity of the input light exceeds the SBS threshold $P_{th}$, the optical intensity of the Brillouin scattered light rapidly increases, and the SBS is generated. The SBS threshold $P_{th}$ is the optical intensity of the input light at a cross point between a fitted line in an area where the optical intensity of the Brillouin scattered light increases in proportion to the optical intensity of the input light without generating a stimulated scattering and a fitted line in an area where the stimulated scattering is generated so that the optical intensity of the Brillouin scattered light rapidly increases, and in the optical fiber according to the first embodiment example, it is 13.8 dBm, as shown in FIG. 9.

The value of the SBS threshold depends on a branch length of the optical fiber, and the above value is for the case where the branch length of the optical fiber is 11.9 km. From this value, a corresponding value in the case where the branch length of the optical fiber is 20 km is obtained to be 12.4 dBm. The SBS threshold of a typical SMF is 6.6 dBm when the branch length is 20 km. It means that the optical fiber according to the first embodiment example offers an optical fiber in which the concentrations of the germanium and the fluorine in each core layer is set in such a manner that the peak on the Brillouin gain spectrum is spread into four peaks, so that the gain is dispersed to each of the peaks and the SBS threshold is 5.8 dBm higher than that of the SMF, while maintaining the optical characteristics equivalent to those of the SMF, such as the wavelength dispersion, the MFD, and the cutoff wavelength. The optical fiber according to the second embodiment example also shows virtually the same SBS threshold.

Furthermore, as shown in FIG. 7, the optical fiber according to the first embodiment example shows four peaks on the Brillouin gain spectrum. When the optical intensity of the input light is low enough without generating the stimulated scattering, for example, 8.62 dBm, a difference between the maximum value and the minimum value of the four peaks is within 6 dB, from which it is confirmed that the gain is spread into each of the peaks with a good balance.

The optical fibers according to the above embodiment examples have the optical characteristics equivalent to those of the SMF in the wavelength dispersion, the MFD, and the cutoff wavelength by setting the design parameters to the above values. Not only for the above embodiment examples, but in any case, it is possible to realize an optical fiber having the optical characteristics equivalent to those of the SMF by selecting each of the design parameters from following ranges and setting them with an appropriate adjustment. For example, to effectively suppress the generation of the SBS while realizing the optical characteristics equivalent to those of the SMF in the case where a/c is larger than 0 and smaller than 1 and b/c is larger than a/c and smaller than 1, it is preferable that $\Delta$1-$GeO_2$ should be 0.45% to 1.1%, $\Delta$1-F should be −0.7% to −0.1%, ($\Delta$1-$GeO_2$)−($\Delta$2-$GeO_2$) should be larger than 0%, ($\Delta$1-F)−($\Delta$2-F) should be smaller than 0%, ($\Delta$2-$GeO_2$)−($\Delta$3-$GeO_2$) should be larger than 0.1%, ($\Delta$2-F)−($\Delta$3-F) should be smaller than −0.1%, and 2c should be 7.5 μm to 10.0 μm. It is further preferable that $\Delta$1-$GeO_2$ should be 0.65% to 1.1%, $\Delta$1-F should be −0.7% to −0.3%, $\Delta$2-$GeO_2$ should be 0.5% to 0.7%, $\Delta$2-F should be −0.4% to −0.1%, $\Delta$3-$GeO_2$ should be 0.35% to 0.5%, $\Delta$3-F should be −0.15% to 0%, a/c should be 0.1 to 0.4, and b/c should be 0.5 to 0.7, because the generation of the SBS can be suppressed more effectively. In addition, by setting $\Delta$3-$GeO_2$ to 0.3% to 0.4% and $\Delta$3-F to 0%, the optical fiber according to the present invention can be manufactured with ease and low cost.

A specific explanation will be given below with calculation examples by simulation. The calculation examples shown below are obtained by calculating a shape of the Brillouin gain spectrum in the case where the design parameters are optimized so that the gain is spread into each peak with a good balance under a condition that some of the design parameters shown in FIG. 3 are changed while fixing the other parameters.

Figure 11:
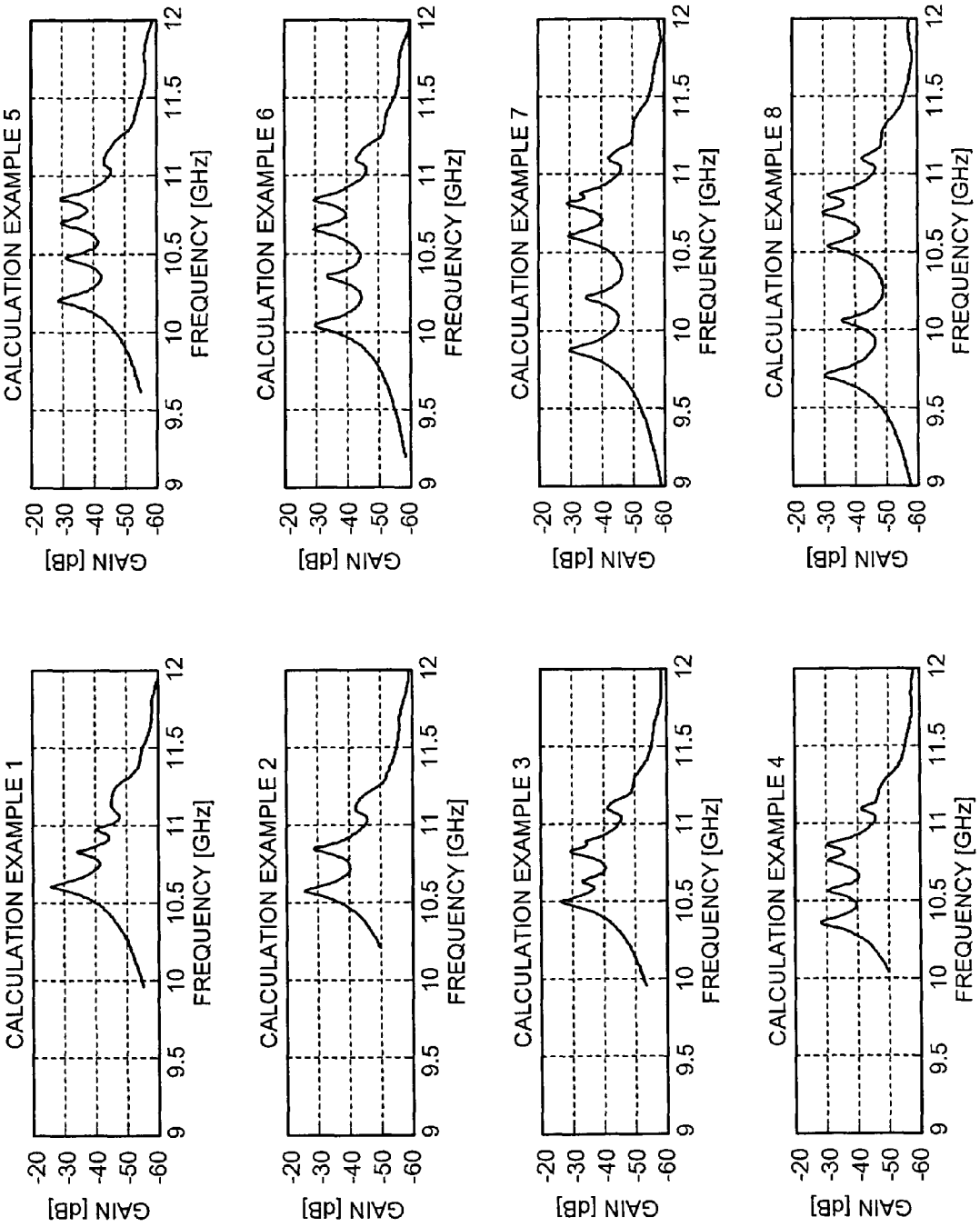
FIG. 11 is a set of graphs showing the Brillouin gain spectra calculated in the first to the eighth calculation examples.

FIG. 10 is a diagram for showing combinations of the design parameters for a first to an eighth calculation examples. In the first to the eighth calculation examples, the calculation is performed with $\Delta$1-$GeO_2$ and $\Delta$1-F changed while fixing the other parameters. Furthermore, the outer core layer is not doped with the fluorine, so that $\Delta$3-F is 0% in any case. FIG. 11 is a set of graphs showing the Brillouin gain spectra calculated in the first to the eighth calculation examples. In FIG. 11, the horizontal axis of each of the graphs indicates frequency [GHz], and the vertical axis indicates gain [dB].

As shown in FIGS. 10 and 11, when ($\Delta$1-$GeO_2$)−($\Delta$2-$GeO_2$) is larger than 0% and ($\Delta$1-F)−($\Delta$2-F) is smaller than 0%, as indicated by the fourth to the eighth calculation examples, the difference between the maximum value and the minimum value of the four peaks on the Brillouin gin spectrum is within 6 dB, so that the gain is spread into each of the peaks with a good balance. Therefore, it is expected that the generation of the SBS is effectively suppressed, and the SBS threshold increases by more than 4 dB compared with the conventional SMF having a single peak. As shown in FIG. 10, for the calculation example showing that the difference between the maximum value and the minimum value of the four peaks on the Brillouin gin spectrum is within 6 dB so that the gain is spread into each of the peaks with a good balance, "○" is marked in the "JUDGE" field.

In FIG. 10, the difference between the maximum value and the minimum value of the four peaks becomes small as the absolute values of $\Delta$1-$GeO_2$ and $\Delta$1-F become large. However, from the limitations on manufacturing, it is difficult to dope the fluorine more than −0.7% by converting it into $\Delta$. Furthermore, from a fact that it is preferable that the total relative refractive index difference should 0.3% to 0.4% in all of the layers to obtain the characteristics equivalent to those of the SMF, as described earlier, it is preferable that $\Delta$1-$GeO_2$ should be equal to or smaller than 1.1%.

Figure 13:
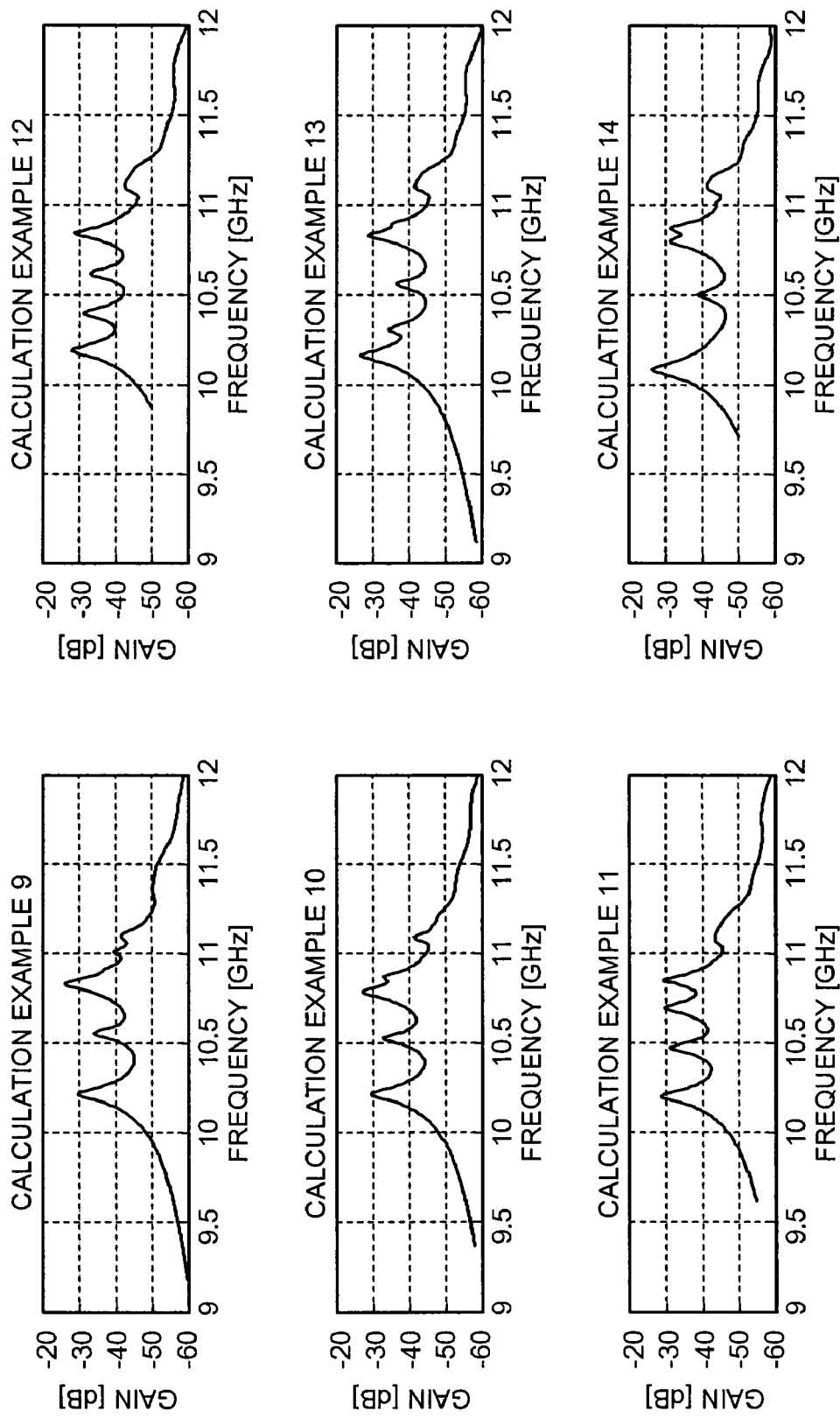
FIG. 13 is a set of graphs showing the Brillouin gain spectra calculated in the ninth to the fourteenth calculation examples.

FIG. 12 is a diagram for showing combinations of the design parameters for a ninth to a fourteenth calculation examples. In the ninth to the fourteenth calculation examples, the calculation is performed with $\Delta$2-$GeO_2$ and $\Delta$2-F changed while fixing the other parameters. Furthermore, the outer core layer is not doped with the fluorine, so that $\Delta$3-F is 0% in any case. FIG. 13 is a set of graphs showing the Brillouin gain spectra calculated in the ninth to the fourteenth calculation examples. As shown in FIGS. 12 and 13, when $\Delta$2-$GeO_2$ is 0.55% to 0.65% and $\Delta$2-F is −0.3% to −0.2%, as indicated by the eleventh and the twelfth calculation examples, "○" is marked in the "JUDGE" field.

Figure 15:
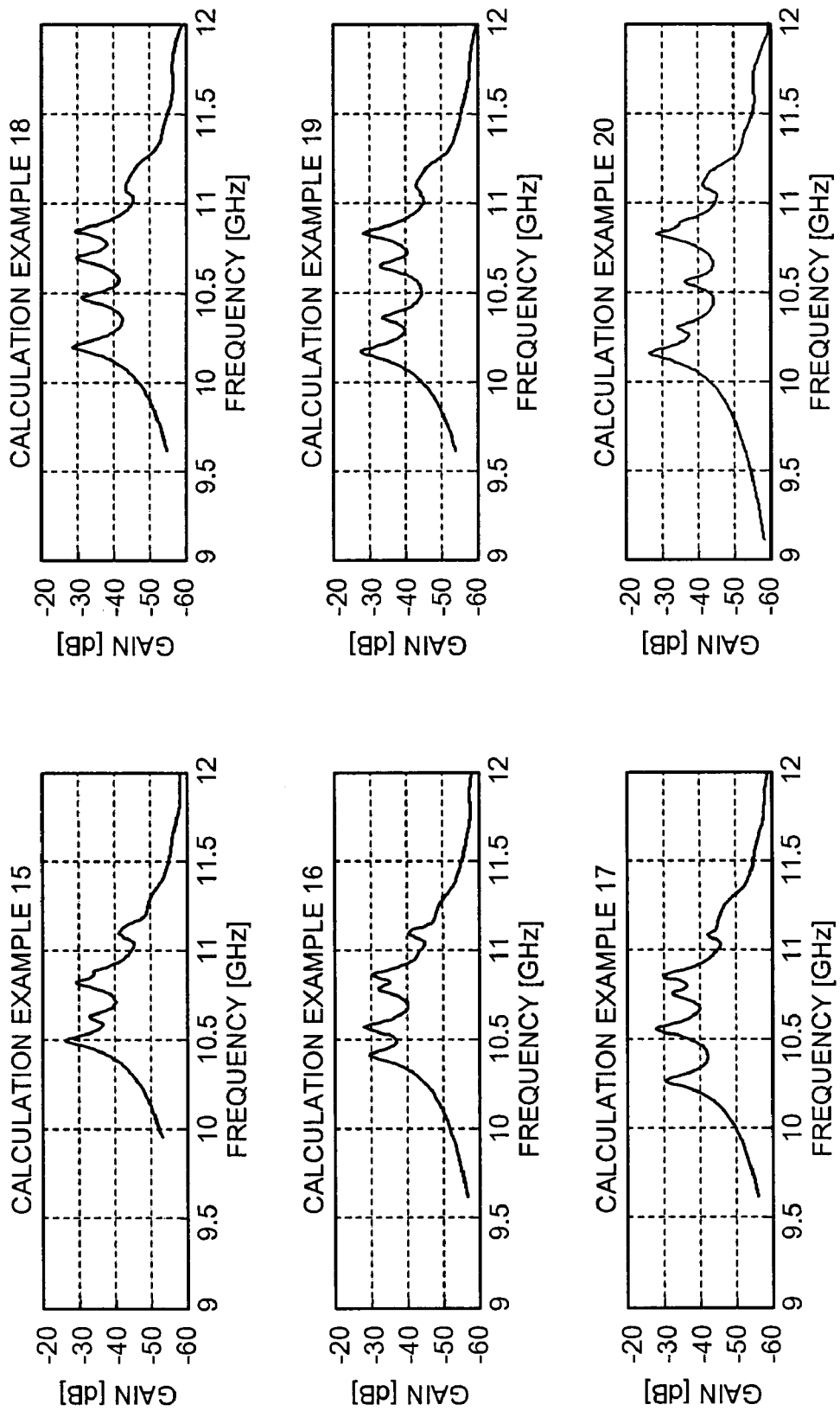
FIG. 15 is a set of graphs showing the Brillouin gain spectra calculated in the fifteenth to the twentieth calculation examples.

FIG. 14 is a diagram for showing combinations of the design parameters for a fifteenth to a twentieth calculation examples. In the fifteenth to the twentieth calculation examples, the calculation is performed with a/c changed while fixing the other parameters. Furthermore, the outer core layer is not doped with the fluorine, so that $\Delta$3-F is 0% in any case. FIG. 15 is a set of graphs showing the Brillouin gain spectra calculated in the fifteenth to the twentieth calculation examples. As shown in FIGS. 14 and 15, when a/c is 0.1 to 0.4, as indicated by the sixteenth to the nineteenth calculation examples, "○" is marked in the "JUDGE" field.

Figure 17:
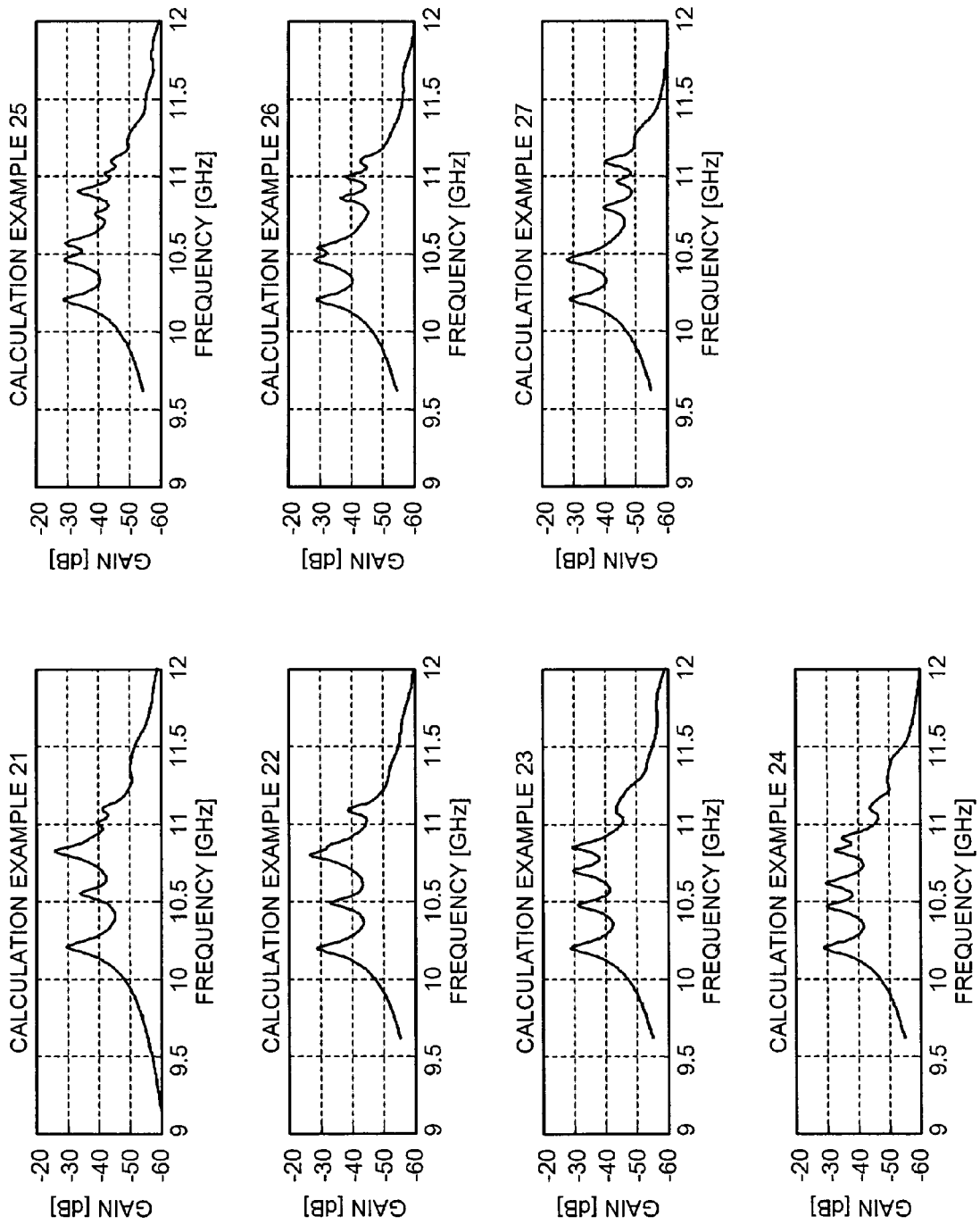
FIG. 17 is a set of graphs showing the Brillouin gain spectra calculated in the twenty-first to the twenty-seventh calculation examples.

FIG. 16 is a diagram for showing combinations of the design parameters for a twenty-first to a twenty-seventh calculation examples. In the twenty-first to the twenty-seventh calculation examples, the calculation is performed with b/c changed while fixing the other parameters. Furthermore, the outer core layer is not doped with the fluorine, so that Δ3-F is 0% in any case. FIG. 17 is a set of graphs showing the Brillouin gain spectra calculated in the twenty-first to the twenty-seventh calculation examples. As shown in FIGS. 16 and 17, when b/c is 0.5 to 0.7, as indicated by the twenty-third to the twenty-fifth calculation examples, "○" is marked in the "JUDGE" field.

Figure 19:
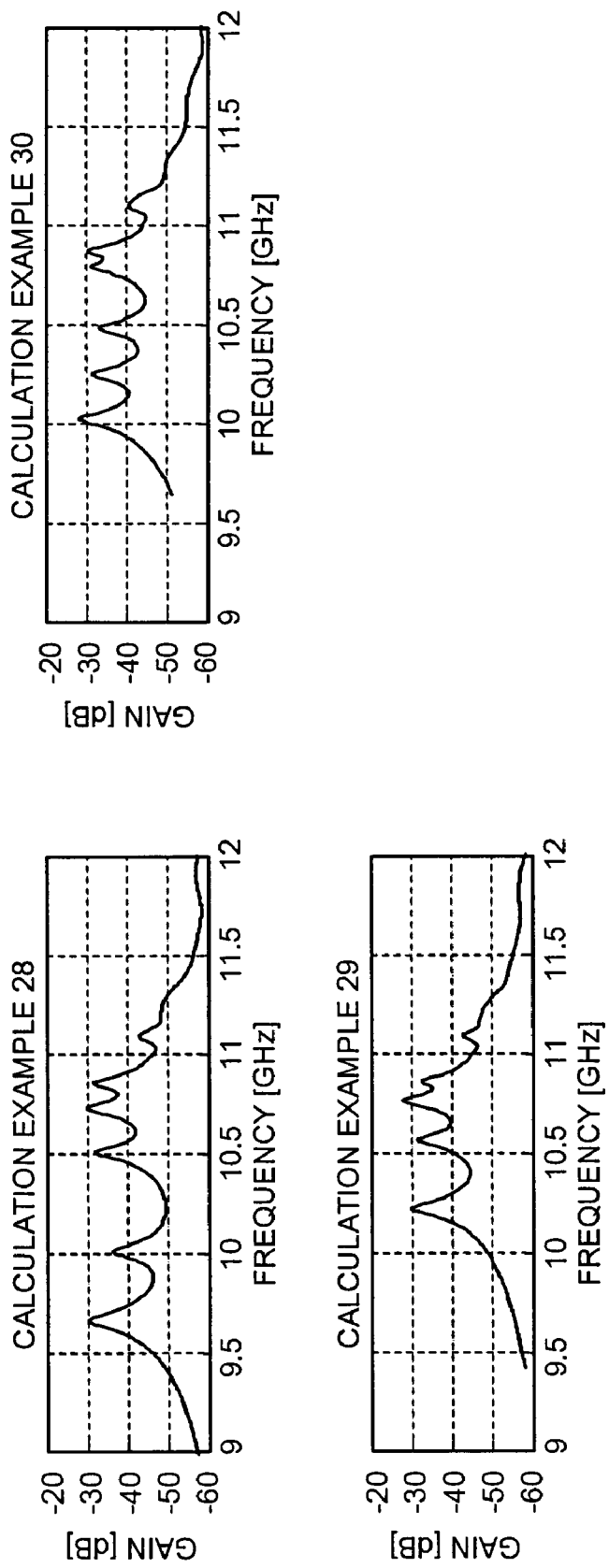
FIG. 19 is a set of graphs showing the Brillouin gain spectra calculated in the twenty-eighth to the thirtieth calculation examples.

FIG. 18 is a diagram for showing combinations of the design parameters for a twenty-eighth to a thirtieth calculation examples. In the twenty-eighth to the thirtieth calculation examples, the calculation is performed with Δ1-$GeO_2$, Δ1-F, a/c, Δ2-$GeO_2$, and Δ2-F changed while fixing the other parameters. Furthermore, the outer core layer is not doped with the fluorine, so that Δ3-F is 0% in any case. FIG. 19 is a set of graphs showing the Brillouin gain spectra calculated in the twenty-eighth to the thirtieth calculation examples. As shown in FIGS. 18 and 19, even when Δ1-$GeO_2$, Δ1-F, a/c, Δ2-$GeO_2$, and Δ2-F are changed, as indicated by the twenty-eighth to the thirtieth calculation examples, "○" is marked in the "JUDGE" field.

Figure 21:
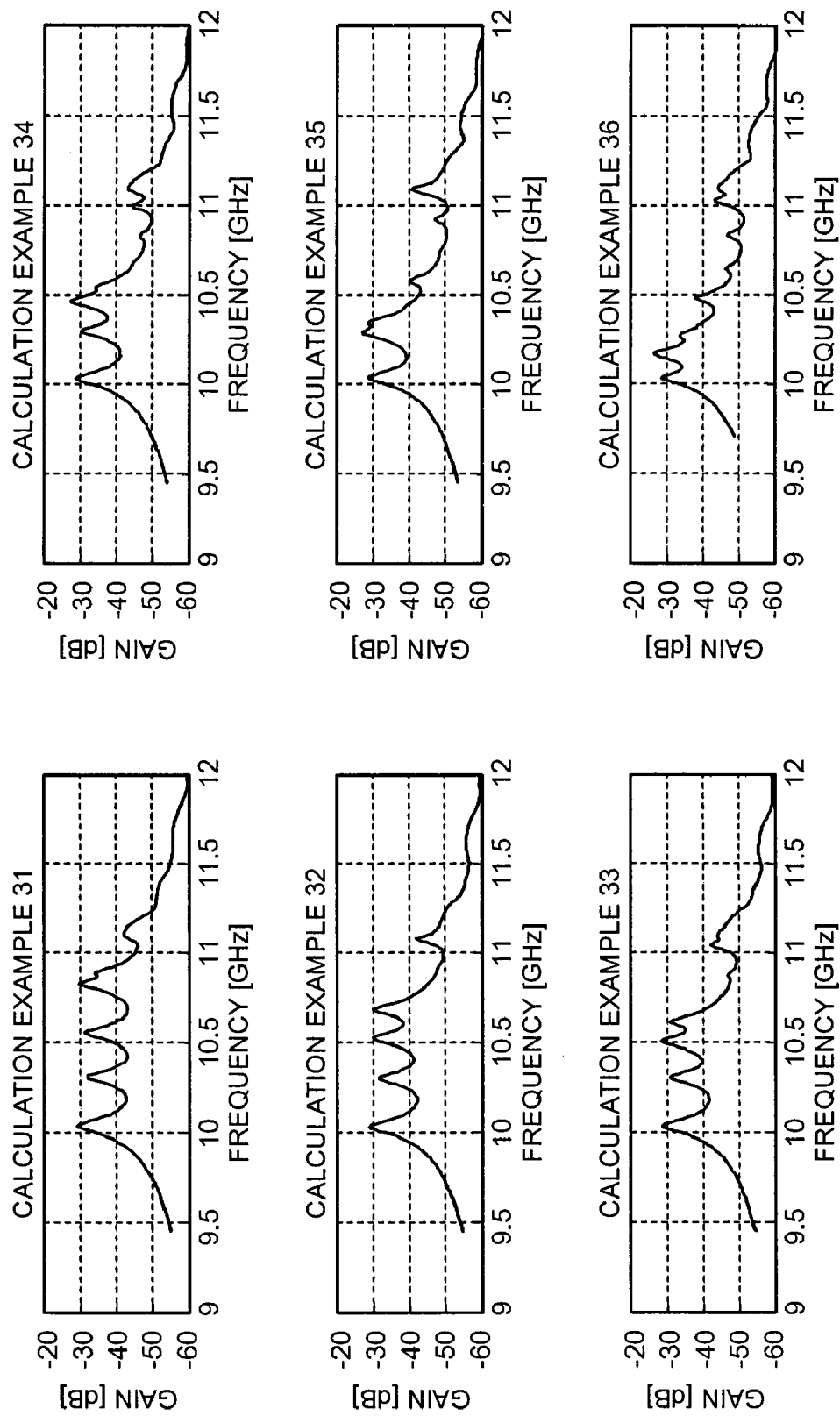
FIG. 21 is a set of graphs showing the Brillouin gain spectra calculated in the thirty-first to the thirty-sixth calculation examples.

FIG. 20 is a diagram for showing combinations of the design parameters for a thirty-first to a thirty-sixth calculation examples. In the twenty-eighth to the thirtieth calculation examples, the calculation is performed with Δe-$GeO_2$ and Δ3-F changed while fixing the other parameters. FIG. 21 is a set of graphs showing the Brillouin gain spectra calculated in the thirty-first to the thirty-sixth calculation examples. As shown in FIGS. 20 and 21, when (Δ2-$GeO_2$)−(Δ3-$GeO_2$) is larger than 0.1 and (Δ2-F)−(Δ3-F) is smaller than −0.1, as indicated by the thirty-first to the thirty-sixth calculation examples, "○" is marked in the "JUDGE" field.

In the first to the thirty-sixth calculation examples, a calculation of an optimization is performed under a condition that some of the design parameters shown in FIG. 3 are changed while fixing the other parameters. However, as a result of performing a calculation of an optimization by changing all of the parameters in realizable ranges, it is confirmed that it is preferable that Δ1-$GeO_2$ should be 0.45% to 1.1%, Δ1-F should be −0.7% to −0.1%, (Δ1-$GeO_2$)−(Δ2-$GeO_2$) should be larger than 0%, (Δ1-F)−(Δ2-F) should be smaller than 0%, (Δ2-$GeO_2$)−(Δ3-$GeO_2$) should be larger than 0.1%, (Δ2-F)−(Δ3-F) should be smaller than −0.1%, and 2c should be 7.5 μm to 10.0 μm, and it is more preferable that Δ1-$GeO_2$ should be 0.65% to 1.1%, Δ1-F should be −0.7% to −0.3%, Δ2-$GeO_2$ should be 0.5% to 0.7%, Δ2-F should be −0.4% to −0.1%, Δ3-$GeO_2$ should be 0.35% to 0.5%, Δ3-F should be −0.15% to 0%, a/c should be 0.1 to 0.4, and b/c should be 0.5 to 0.7, to effectively suppress the generation of the SBS. In addition, by setting Δ3-$GeO_2$ to 0.3% to 0.4% and Δ3-F to 0%, without having the outer core layer doped with the fluorine, the structure of the optical fiber is simplified, so that the optical fiber according to the present invention can be manufactured with ease and low cost.

Although the refractive index profile of the core is the step-index type in the above-described embodiment, an arbitrary refractive index profile can be used in response to the demanded characteristics of the optical fiber, such as a graded-index type, a W type, a Wseg type, and a concave guide type. Furthermore, although the silica-glass based cladding is used, a fluorine-doped glass can also be used. Moreover, the layer doped with at least one of the germanium and the fluorine can be four layers or more.

As described above, according to an aspect of the present invention, because the core includes three or more layers doped with germanium and fluorine, and a concentration of the germanium and the fluorine in the layers is controlled in such a manner that a Brillouin gain spectral peak is spread into a plurality of peaks on a Brillouin gain spectrum, a superposition of the light propagating through the optical fiber and the acoustic wave is adjusted, so that the Brillouin gain spectral peak is spread into a plurality of peaks on a Brillouin gain spectrum. As a result, the SBS threshold is increased, and there is an effect that makes it possible to realize an optical fiber that can suppress generation of the SBS without changing the characteristics in the longitudinal direction of the fiber.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A silica-based optical fiber comprising:
   a core including three or more layers, each of the three or more layers being doped with at least one of germanium and fluorine, the three or more layers include at least:
      a center core layer,
      an inner core layer formed on an outer circumference of the center core layer, and
      an outer core layer formed on an outer circumference of the inner core layer, wherein
   a total relative refractive index difference in the core layers is 0.3% to 0.4%, and
   when a relative refractive index difference of a center core layer caused by the germanium is Δ1-$GeO_2$, a relative refractive index difference of the center core layer caused by the fluorine is Δ1-F, a relative refractive index difference of an inner core layer caused by the germanium is Δ2-$GeO_2$, a relative refractive index difference of the inner core layer caused by the fluorine is Δ2-F, a relative refractive index difference of an outer core layer caused by the germanium is Δ3-$GeO_2$, a relative refractive index difference of the outer core layer caused by the fluorine is Δ3-F, and a core diameter of the outer core layer is 2c, Δ1-$GeO_2$ is 0.45% to 1.1%, Δ1-F is −0.7% to −0.1%, (Δ1-$GeO_2$)−(Δ2-$GeO_2$) is larger than 0%, (Δ1-F)−(Δ2-F) is smaller than 0%, (Δ2-$GeO_2$)−(Δ3-$GeO_2$) is larger than 0.1%, (Δ2-F)−(Δ3-F) is smaller than −0.1%, and 2c is 7.5 μm to 10.0 μm.

2. The optical fiber according to claim 1, wherein
   Δ1-$GeO_2$ is 0.65% to 1.1%, Δ1-F is −0.7% to −0.3%, Δ2-$GeO_2$ is 0.5% to 0.7%, Δ2-F is −0.4% to −0.1%, Δ3-$GeO_2$ is 0.35% to 0.5%, Δ3-F is −0.15% to 0%, and
   when a core diameter of the center core layer is 2a, and a core diameter of the inner core layer is 2b, 2a/2c is 0.1 to 0.4, and 2b/2c is 0.5 to 0.7.

* * * * *